(12) United States Patent
Höchsmann et al.

(10) Patent No.: US 7,874,445 B2
(45) Date of Patent: Jan. 25, 2011

(54) INTERCHANGEABLE CONTAINER

(75) Inventors: Rainer Höchsmann, Genderkingen (DE); Alexander Müller, Königsbrunn (DE); Uli Schrupp, Diedorf (DE); Stefan Hühn, Augsburg (DE); Udo Marschner, Biburg (DE); Martin Stachulla, Augsburg (DE)

(73) Assignee: ProMetal RCT GmbH, Augsburg (DE)

( * ) Notice: Subject to any disclaimer, the term of this patent is extended or adjusted under 35 U.S.C. 154(b) by 587 days.

(21) Appl. No.: 11/771,633

(22) Filed: Jun. 29, 2007

(65) Prior Publication Data

US 2008/0053998 A1     Mar. 6, 2008

(30) Foreign Application Priority Data

Jul. 4, 2006    (DE) .................. 20 2006 010 327 U

(51) Int. Cl.
*B65D 55/00*      (2006.01)
*B65D 85/00*      (2006.01)

(52) U.S. Cl. ..................... 220/211; 220/529; 220/536; 220/544; 220/554; 206/761; 312/319.8

(58) Field of Classification Search ................ 206/556, 206/761; 220/211, 287, 529, 536, 544, 554, 220/600; 312/319.8
See application file for complete search history.

(56) References Cited

U.S. PATENT DOCUMENTS

| 6,286,827 | B1 * | 9/2001 | Meetze et al. .............. 271/162 |
| 6,554,600 | B1 | 4/2003 | Hofmann et al. |
| 7,004,222 | B2 | 2/2006 | Ederer et al. |
| 7,204,684 | B2 | 4/2007 | Ederer et al. |
| 2004/0035542 | A1 | 2/2004 | Ederer et al. |
| 2006/0108090 | A1 | 5/2006 | Ederer et al. |
| 2009/0072688 | A1* | 3/2009 | Fu et al. .................. 312/319.8 |

FOREIGN PATENT DOCUMENTS

| DE | 10047614 A1 | 4/2002 |
| DE | 10047615 A1 | 4/2002 |
| EP | 1037739 B1 | 9/2000 |
| WO | 0226420 A1 | 4/2002 |

OTHER PUBLICATIONS esp@cenet, English abstract of EP 10 37 739 B1.
esp@cenet, English abstract of DE 100 47 615 A1.
esp@cenent, English abstract of DE 100 47 614 A1.
European Patent Office, Examination Search Report for EPO App. No. 07111677.6-1233, Nov. 23. 2007, pp. 2, 4-5.

* cited by examiner

*Primary Examiner*—Anthony Stashick
*Assistant Examiner*—Madison L Wright
(74) *Attorney, Agent, or Firm*—Cahn & Samuels, LLP

(57) ABSTRACT

An interchangeable container for a system for building a mold body by forming superimposed layers of granular material, the granular material locally and selectively hardened layer by layer. The container includes a bottom structure that is displaceable in the interior of the container in a direction in parallel with the container side walls and at least one spindle drive having a vertical screw spindle rotatably mounted in a container side of the container, and a spindle screw nut on which the bottom structure is supported. The bottom structure can be lowered step by step in the interior of the container by the spindle drive.

10 Claims, 4 Drawing Sheets

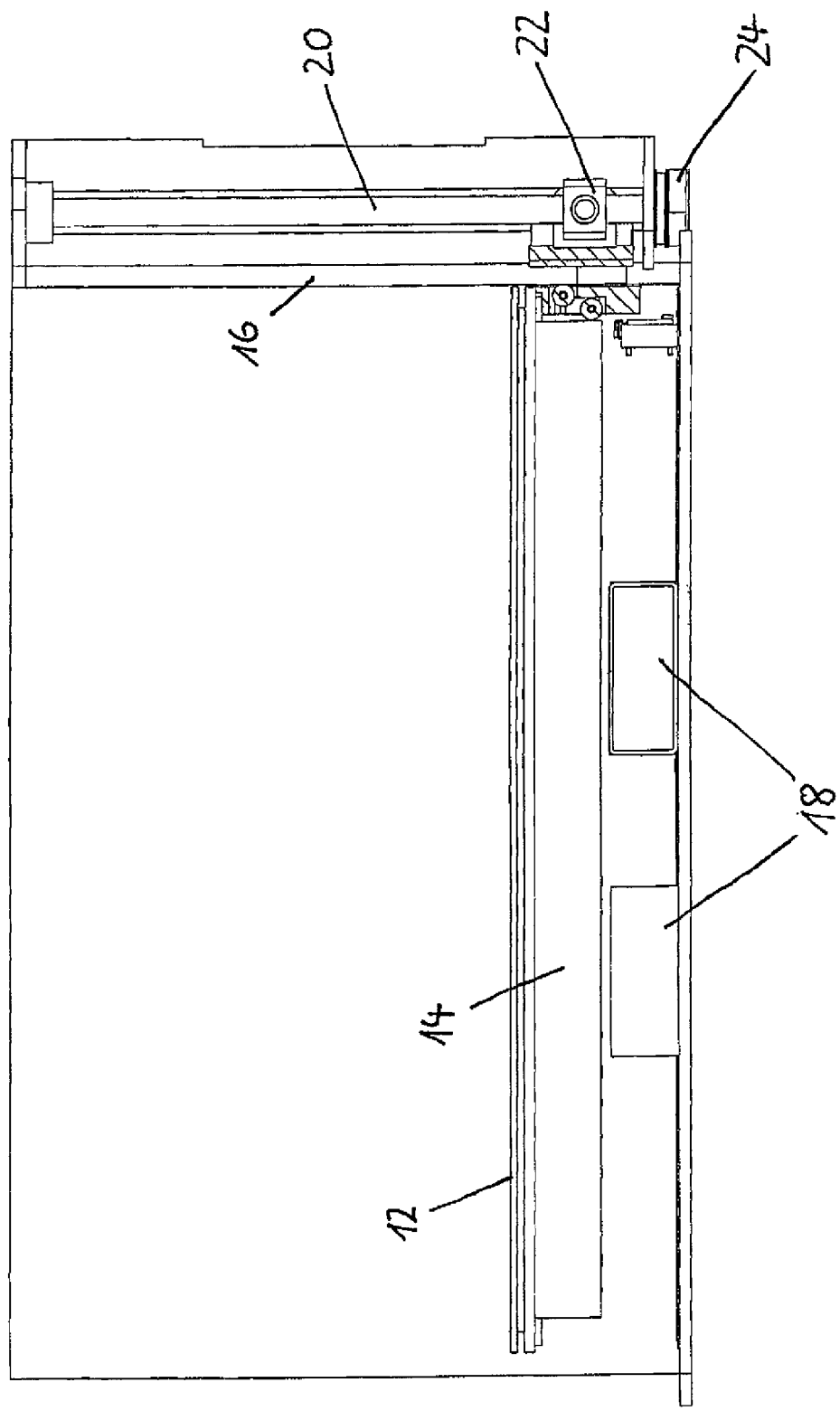

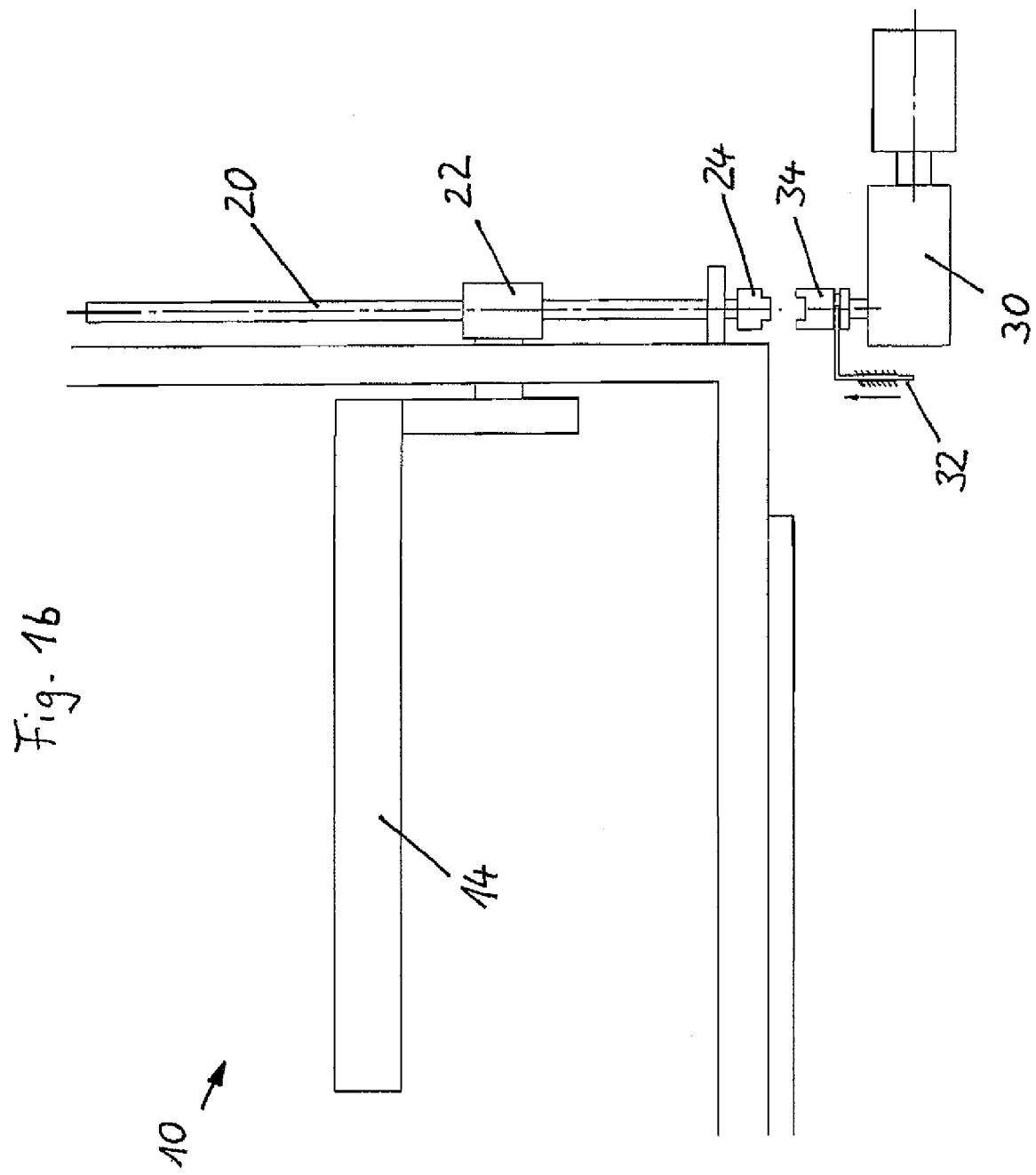

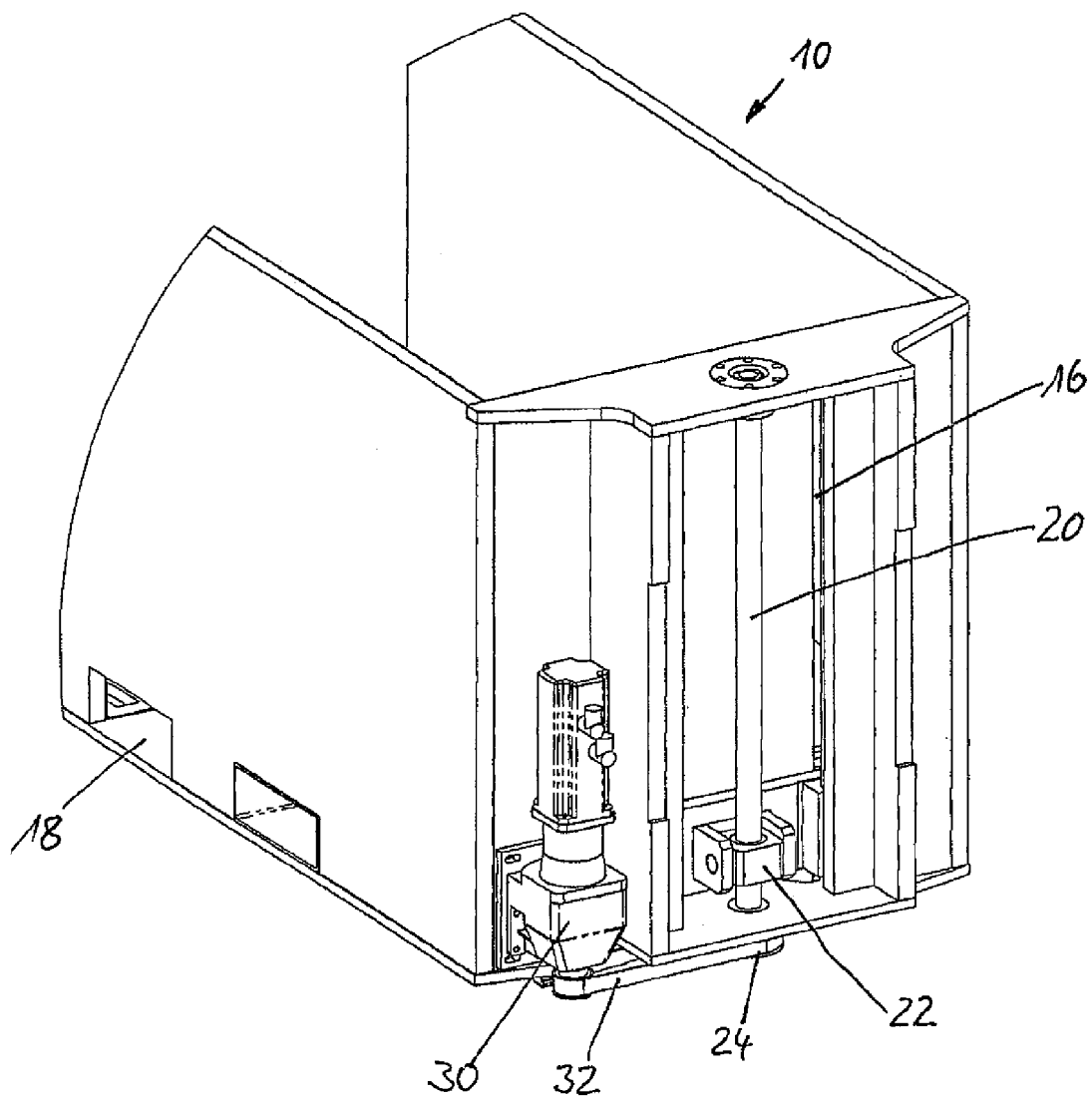

INTERCHANGEABLE CONTAINER

This patent application claims priority under 35 U.S.C. §119 to German patent application number 20 2006 010 327.9 filed on Jul. 4, 2006, which is hereby incorporated by reference.

I. FIELD OF THE PRESENT INVENTION

The invention relates to an interchangeable mobile container for a system for building a mold body by forming superimposed layers of granular material.

II. BACKGROUND OF THE INVENTION

In prior art, systems and methods are known in the field of rapid prototyping and laser sintering, wherein a granular material is deposited in separate layers on a platform in a container, and is hardened locally and selectively layer by layer, so as to build up a solidified mold body from the granular material. For doing so, the bottom of the container, which is formed by the platform and which is height-adjustable, is lowered by one layer thickness respectively before application of a new layer. Once all necessary layers are applied and selectively hardened, the mold body formed in this manner may be removed, for example in a removal station, by removing the non-solidified granular material.

A removable or interchangeable container in which a mold body can be built in this manner is for example known from EP 1037739 B1. The interchangeable container disclosed therein comprises a container bottom forming a workpiece platform that can be moved vertically within the container. The interchangeable container comprises engagement recesses in a rear side wall, through which one or more support arms reach underneath the workpiece platform, the support arms being height-adjustably mounted to the building station of the system. As soon as the forming of a mold body is complete, the workpiece platform is locked and the whole interchangeable container including the mold body can be removed from the building station of the system.

Alternatively, a lifting device may be integrated in the interchangeable container under the workpiece platform according to cited prior art for the height-adjustability of the same.

However, interchangeable containers designed in this manner have the disadvantage that they have to comprise sufficiently large and long engagement recesses in the embodiment without an integrated lifting device, in order that the support arms at the building station of the system can engage therethrough. In addition, locking devices are required, in order to allow the workpiece platform to remain at an unchanged level when the interchangeable container is removed from the building station, wherein then the support arms are not disposed underneath the workpiece platform anymore. On the other hand, the interchangeable container comprising a lifting device integrated under the workpiece platform is very complex, whereby the interchangeable container becomes large and heavy and is therefore difficult to handle when changing or moving from one station to another.

III. SUMMARY OF THE INVENTION

It is an object of the present invention to provide an interchangeable container which is easy to handle and the height-adjustable workpiece platform of which can be operated in an easy and reliable manner.

According to the present invention, an interchangeable container is provided for a system for building a mold body by forming superimposed layers of granular material, the granular material locally and selectively hardened layer by layer, the container including a bottom structure that is displaceable in the interior of the container in a direction in parallel with the container side walls, the container further including at least one spindle drive comprising a vertical screw spindle which is rotatably mounted in a container side of the container, and a spindle screw nut on which the moveable bottom structure is supported, such that the bottom structure can be lowered step by step in the interior of the container by means of a spindle drive which is directly integrated into a side wall of the container.

In an embodiment of the present invention, the screw spindle further comprises a drive clutch at the lower spindle end for detachably coupling with a stationary stepping motor.

Alternatively, a stepping motor can be directly integrated into the container, wherein the stepping motor is coupled by means of a transmission member with the screw spindle.

IV. BRIEF DESCRIPTION OF THE DRAWINGS

The invention will be explained on the following pages on the basis of preferred embodiments with reference to the figures of the drawings, wherein:

FIG. 1a is a sectional lateral view of an interchangeable container according to a first embodiment of the invention;

FIG. 1b is schematic partial view of an interchangeable container according to the first embodiment;

FIG. 2 is a perspective view of an interchangeable container according to a second embodiment of the invention;

V. DETAILED DESCRIPTION OF THE INVENTION

Figure 3:
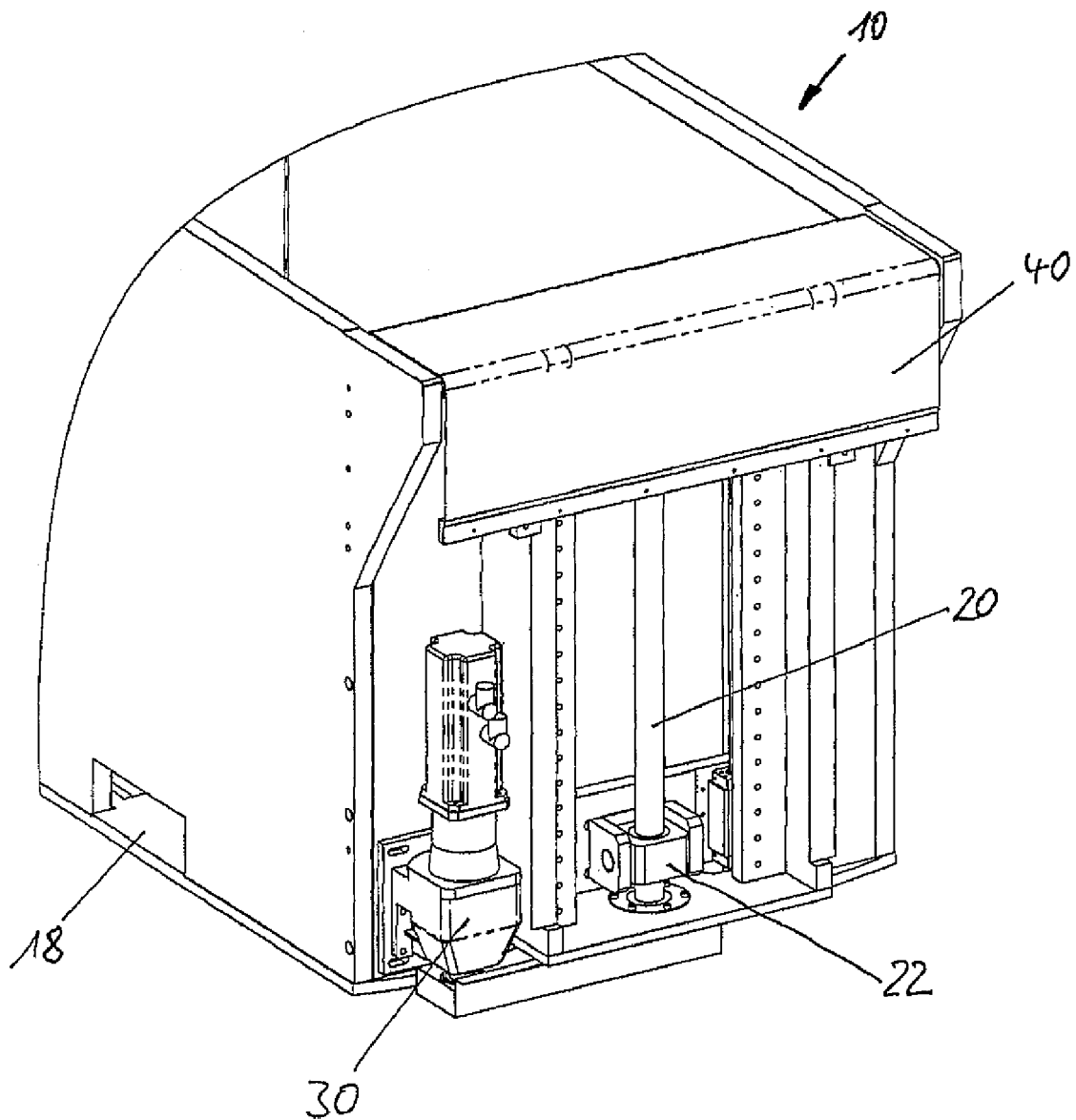
FIG. 3 is a perspective view of an interchangeable container according to a third embodiment of the invention.

According to the first embodiment, which is shown in a sectional lateral view of FIG. 1a and in a partial view of FIG. 1b, the interchangeable container 10 according to the invention is formed as a mobile container which is substantially rectangular and has four side walls and is open on the top side.

Although the interchangeable container 10 may have a square cross-section, the interchangeable container preferably has an elongated rectangular cross-section, which is limited by two horizontally long sidewalls and two horizontally short side walls, which are each arranged so as to face each other in pairs. One of the side walls, which in this case is one of the short side walls, comprises engagement recesses 16 being formed like vertical slots. Support projections of a bottom structure 14 which is height-adjustable in the container reach through the engagement recesses 16, on which bottom structure a workpiece platform 12 forming the bottom of the container is supported in the interior of the container, and which itself is supported on a lifting device which is provided on the outer surface of the short side wall of the container 10. The bottom structure 14 may be designed in the form of support arms or in the form of a support frame or the like.

The lifting device comprises a spindle drive or ball-screw actuator, wherein the spindle screw nut 22 which is adjusted along the screw spindle 20 by turning the same, is provided as circulating ball screw nut. The spindle 20 is arranged vertically and is preferably pivoted at the top and at the bottom. The spindle screw nut 22 is firmly connected to the bottom structure 14, and by a movement of the spindle screw nut 22 along the spindle 20, a height-adjustability of the bottom structure 14 and thereby of the workpiece platform 12 is provided. In addition, the spindle drive may be self-locking, such that no support of the workpiece platform 12 is necessary when removing the interchangeable container 10 from a station.

Furthermore, at one end of the spindle 20, preferably at the lower end thereof, a clutch 24 is provided for coupling to a motor 30. The motor 30 for powering the spindle 20 is preferably an electrical direct current servo motor or stepping motor which in this first embodiment is provided stationarily at the building station of the rapid prototyping system. As soon as the interchangeable container is inserted into the building station of the system, the driven shaft of the motor 30 disposed in the building station is engaged in a preferably self-acting manner with the clutch 24 of the spindle 20 via a transmission member, so as to easily ensure a gradual lowering of the workpiece platform in the building station for applying separate layers of the granular material.

As shown in FIG. 1b, the transmission member can be a coupling member 34 on the driven shaft of the motor 30 being stationary in this case, which has positive fit with the clutch 24 at the spindle 20. The coupling member 34 can be displaced axially on the driven shaft of the motor 30 and can be engaged or disengaged with the clutch 24 at the spindle 20 by means of a displacing device 32.

The transmission member for transmitting motor power to the clutch 24 and thereby to the spindle 20 may for example also comprise a belt drive, in particular a cogged belt drive or chain. Transmission of the motor power to the spindle may also take place by means of a gear transmission or by means of coupling disks.

In one alternative of the first embodiment of the invention, the interchangeable container comprises in each of the two short side walls a lifting device in the form of a spindle drive. This means that engagement recesses 16 are provided on two sides of the container 10 facing each other, through which the support projections of the bottom structure 14 reach, on which the workpiece platform 12 is supported. At the outer surface of the container 10, the support projections of the bottom structure 14 are connected at their respective ends to a spindle screw nut 22 which is arranged to be moved on a vertically arranged spindle 20. Every lifting device is provided with at least one spindle 20, which is preferably arranged in the lateral center of the container side. In order to allow a simultaneous and synchronous motion of the spindles 20 and thus a homogeneous lowering of the workpiece platform 12 when building the mold body, the two spindles may be coupled to each other underneath the container, for example by means of a toothed belt, whereby for both lifting devices one joint motor can be provided, wherein one of the spindles can be provided with a clutch 24 for coupling to a coupling 34 of a stationary motor 30 in addition to the toothed belt, as explained on the basis of FIG. 1b. In the building station there can also be a second motor which is coupled to the second spindle, wherein the two motors are controlled to be synchronized with each other.

Optionally, recesses 18 may be provided in the lower edges of the long side walls of the interchangeable container 18, through which for example a forklift truck can reach with its fork, so as to move the interchangeable container into a station of the system or out of the same.

According to the second embodiment of the present invention, which is shown in FIG. 2, the interchangeable container 10 which is substantially equal to the interchangeable container according to the first embodiment comprises a stepping motor 30 which is mounted to the side wall where the ball-screw actuator 20 is located, such that a lifting device including a stepping motor is integrated in at least one side of the interchangeable container. As shown in FIG. 2, the stepping motor 30 may be located next to the spindle 20 at a corner of the container. In this embodiment, transmission of the motor power to the spindle is ensured by means of a toothed belt 32. The energy for the motor 30 may be provided by an accumulator directly at the interchangeable container 10, or plug contacts may be provided which act together with corresponding plug contacts at the building station or another station of the system, in order to provide the motor 30 with power or energy.

Also in this embodiment, the interchangeable container may comprise a neck spindle 20 on each container side facing each other, wherein only one drive motor is provided which is coupled to one of the spindles 20, which on their part are coupled to each other, or wherein one drive motor 30 is provided per spindle 20 and these drive motors are concurrently synchronized with each other.

In the first embodiment as well as in the second embodiment, the engagement recesses are closed by means of brush sealings, band sealings or the like, at least above the workpiece platform in each of the height-adjusting positions of the same, in order to prevent the granular material from coming out on the side. For example, a corrugated tube might be provided at the spindle as additional protection.

According to the third embodiment of the invention, which is shown in FIG. 3, the interchangeable container 10, which incidentally is substantially equal to the third and second embodiment, respectively, is designed without having a side wall on the side comprising the spindle. Instead, a curtain 40 is provided. The curtain 40 serves for sealing the open side of the container at least above the workpiece platform, in order to prevent granular or powdery material from pouring out of the container 10 on the side. The curtain 40 extends over the entire width of the short side of the container, such that in this embodiment the side wall may be omitted entirely. The curtain 40 is attached to the lateral edge of the workpiece platform 12 and extends from this edge along the inner surface up to the upper edge of the container, is diverted outside by guide rolls at the upper edge, and can be guided downwards again at the outer side of the interchangeable container 10. Alternatively, the curtain may be rolled up. In order to ensure a continuous guiding of the curtain 40 when lowering the workpiece platform 12, the curtain may be kept under stress and guided at the same time at its end which is disposed outside the interchangeable container 10 by means of a suitable device. Such a suitable device may comprise extension springs or a wire or a cord which is winded up or down under stress. The curtain itself particularly consists of a steel band or a band made of fiber-reinforced synthetic material, such that it is on the one hand flexible enough to be guided at the upper edge of the interchangeable container, and on the other hand strong enough to resist the load acting laterally on the curtain due to the granular material on the inner side of the container.

It should be noted that the second or third embodiment may also comprise two spindle drives which are arranged as described with regard to the alternative of the first embodiment.

Although it is not shown in the figures, there might also be an embodiment of the interchangeable container being entirely or in part open on each side comprising a spindle 20, without the curtain 40 according to the third embodiment or sealings for engagement recesses according to the first or second embodiment being provided. In such embodiments the layered body built in the interchangeable container on the building platform may be provided with an artificial wall which is built by selectively hardening the granular material layer by layer along the open side of the container or at least along the engagement recesses.

We claim:

1. An interchangeable container for a system for building a mold body by forming superimposed layers of granular material, the granular material locally and selectively hardened layer by layer, the container comprising:
    at least one pair of side walls;
    a bottom structure that is displaceable in the interior of the container in a direction in parallel with said side walls; and
    at least one spindle drive comprising
        a vertical screw spindle which is rotatably mounted in a container side of the container, and
        a spindle screw nut on which the bottom structure is supported, such that the bottom structure can be lowered step by step in the interior of the container by means of the spindle drive.

2. The Interchangeable container according to claim 1, wherein the screw spindle further comprises a drive clutch for detachably coupling with a stationary stepping motor.

3. The interchangeable container according to claim 2, wherein a curtain is attached to the bottom structure along the container side on which the screw spindle is arranged, the curtain deviated by means of rolls on a upper side of the container and adjustably drawn down in correspondence with the lowering motion of the bottom structure.

4. The interchangeable container according to claim 1, wherein in a lower container portion, on the container side comprising the screw spindle, a stepping motor is integrated into the container, the stepping motor being coupled by means of a transmission member with the screw spindle.

5. The interchangeable container according to claim 4, wherein a curtain is attached to the bottom structure along the container side on which the screw spindle is arranged, the curtain deviated by means of rolls on an upper side of the container and adjustably drawn down in correspondence with the lowering motion of the bottom structure.

6. The interchangeable container according to claim 1, wherein a curtain is attached to the bottom structure along the container side on which the screw spindle is arranged, the curtain deviated by means of rolls on an upper side of the container and adjustably drawn down in correspondence with the lowering motion of the bottom structure.

7. An interchangeable container for a system for building a mold body by forming superimposed layers of granular material, the granular material locally and selectively hardened layer by layer, the container comprising:
    at least one pair of side walls;
    a bottom structure that is displaceable in an interior of the container in a direction in parallel with said side walls; and
    at least one spindle drive comprising
        a vertical screw spindle which is rotatably mounted in a side of the container, and
        a spindle screw nut on which the bottom structure is supported, such that the bottom structure can be lowered step by step in the interior of the container along the vertical screw spindle by the spindle drive.

8. The interchangeable container according to claim 7, wherein in a lower container portion, on the container side comprising the screw spindle, a stepping motor is integrated into the container, the stepping motor being coupled by means of a transmission member with the screw spindle.

9. The interchangeable container according to claim 8, wherein a curtain is attached to the bottom structure along the container side on which the screw spindle is arranged, the curtain deviated by means of rolls on an upper side of the container and adjustably drawn down in correspondence with the lowering motion of the bottom structure.

10. The interchangeable container according to claim 7, wherein a curtain is attached to the bottom structure along the container side on which the screw spindle is arranged, the curtain deviated by means of rolls on an upper side of the container and adjustably drawn down in correspondence with the lowering motion of the bottom structure.

* * * * *